M. G. HUBBARD.
Harvester Rake.
No. 15,655.  Patented Sept. 2, 1856.
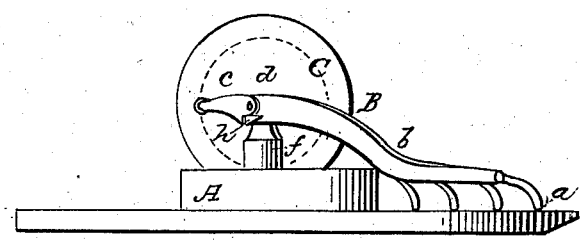
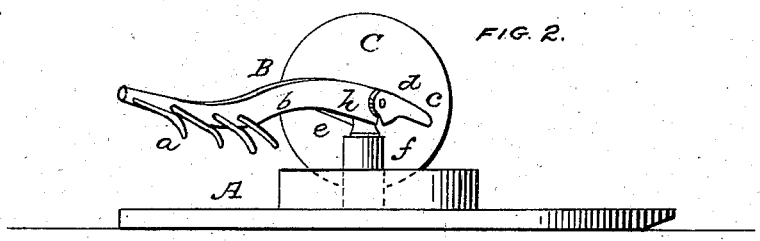
FIG. 2.
FIG. 3.
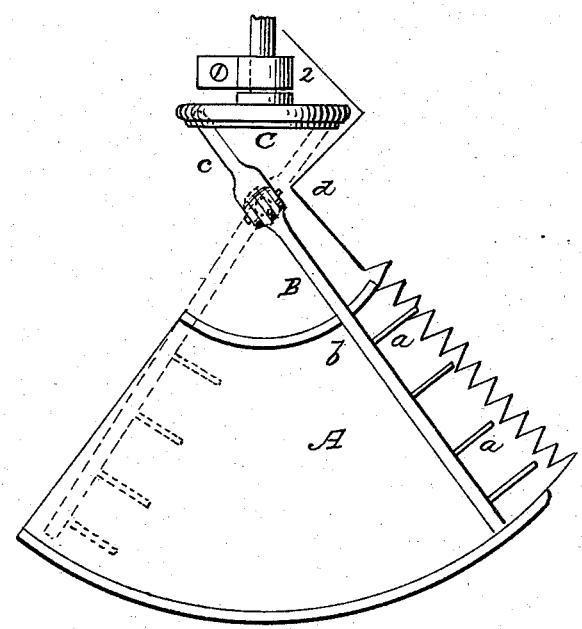

UNITED STATES PATENT OFFICE.

M. G. HUBBARD, OF PENN YAN, NEW YORK.

IMPROVED RAKING ATTACHMENT FOR REAPERS.

Specification forming part of Letters Patent No. 15,655, dated September 2, 1856.

*To all whom it may concern:*

Be it known that I, M. G. HUBBARD, of Penn Yan, in the county of Yates and State of New York, have invented a new and Improved Raking Attachment for Reapers; and I do hereby declare that the following is a full, clear, and exact description of the same, reference being had to the annexed drawings, making a part of this specification, in which—

Figures 1 and 2 are side views of my improvement. Fig. 3 is a plan or top view of the same.

Similar letters of reference indicate corresponding parts in the several figures.

My invention relates to certain improvements in Atkin's rake for harvesting-machines, and by which the same is greatly simplified; and it consists in having the bar to which the rake is attached provided with a joint and attached to an upright, the inner end of said bar being connected with a pulley near its periphery, the above parts being arranged, as will be presently fully shown and described, so that as the pulley is rotated the rake will sweep over the platform and rake the grain therefrom and then rise and pass to the front end of the platform, descend, and again sweep over the platform.

To enable others skilled in the art to fully understand and construct my invention, I will proceed to describe it.

A represents the platform of a reaper, which is of curved or segment form, as shown plainly in Fig. 3.

B represents the rake-bar, to the outer end of which teeth *a* are affixed, said teeth forming the rake. The rake-bar is formed of two parts, *b c*, which are connected by a joint, *d*, and the inner end of the part *b*, at the joint *d*, is secured to a swivel, *e*, which is fitted in the upper end of an upright, *f*, at the side of the platform. The inner end of the part *c* of the rake-bar is fitted in a pulley, C, near its edge, the axis of said pulley being in an upright, *g*. The inner end of the part *b* of the rake-bar has a ledge, *h*, at each side, against which the outer end of the part *c* bears when depressed. (See Figs. 1 and 2.) The pulley C is driven by a belt or gearing from the driving-wheel of the machine.

From the above description it will be seen that as the machine is drawn along and the pulley C rotated the rake-bar B will be vibrated upon the upright *f*, the teeth *a* being down upon the platform A and drawn or swept over the platform while the inner end of the part *c* is passing over the axis of the pulley C, and the teeth raised and passed over to the front end of the platform and depressed while the inner end of part *c* is passing underneath the axis of the said pulley.

The above invention is extremely simple, may be constructed and applied at a small cost, and operated with a small expenditure of power.

Having thus described my invention, what I claim as new, and desire to secure by Letters Patent, as an improvement in the "Atkin's rake," so called, is—

The jointed rake-bar B, attached to the upright *f*, and connected with the pulley C, as shown and described, for the purpose set forth.

M. G. HUBBARD.

Witnesses:
 I. F. BUCKLEY,
 WILLIAM TUSCH.